United States Patent [19]

Schiefer

[11] Patent Number: 4,762,640

[45] Date of Patent: Aug. 9, 1988

[54] FOAM CONTROL PROCESS FOR HIGHLY ACIDIC AQUEOUS SYSTEMS

[75] Inventor: Harry M. Schiefer, Midland, Mich.

[73] Assignee: Dow Corning Corporation, Midland, Mich.

[21] Appl. No.: 940,686

[22] Filed: Dec. 11, 1986

[51] Int. Cl.$^4$ .............................................. B01D 19/04
[52] U.S. Cl. ...................................... 252/321; 252/358
[58] Field of Search ................................ 252/321, 358

[56] References Cited

U.S. PATENT DOCUMENTS

| | | | |
|---|---|---|---|
| 3,784,479 | 1/1974 | Keil | 252/358 |
| 3,912,652 | 10/1975 | Colguhoun | 252/358 |
| 3,984,347 | 10/1976 | Keil | 252/321 |
| 4,076,648 | 2/1978 | Prokai et al. | 252/364 |
| 4,107,068 | 8/1978 | Rosen | 252/358 |
| 4,395,352 | 7/1983 | Kulkarni | 252/321 |
| 4,460,493 | 7/1984 | Lomas | 252/321 |

FOREIGN PATENT DOCUMENTS 139107 10/1981 Japan .

OTHER PUBLICATIONS

"Antifrothing Agents for Aqueous Media with Surfactants", by N. F. Orlov & N. V. Vvedensky, Dec. 14–16, 1966, pp. 234–237, *Chemistry and Practical Application of Organosilicon Compounds* Conference Proceedings.

*Primary Examiner*—John F. Terapane
*Assistant Examiner*—Catherine S. Kilby
*Attorney, Agent, or Firm*—Alexander Weitz

[57] ABSTRACT

A process for controlling foaming in highly acidic aqueous system using a silicone foam control agent is disclosed. The foam control agent consists essentially of (A) a dimethylpolysiloxane gum having a viscosity greater than about 150,000 Poise at 25° C., (B) a nonionic surfactant, (C) a siloxane copolymer dispersing agent and, optionally, (D) water.

8 Claims, No Drawings

FOAM CONTROL PROCESS FOR HIGHLY ACIDIC AQUEOUS SYSTEMS

BACKGROUND OF THE INVENTION

This invention relates to a process for controlling foaming in an aqueous system. More particularly, this invention relates to foam control in a highly acidic aqueous system wherein the foam control agent consists essentially of a dimethylpolysiloxane gum, a non-ionic surfactant, a siloxane copolymer dispersing agent and, optionally, water.

The use of various silicone containing compositions as antifoams or defoamers is known. In this regard, it is well established that this art is highly unpredictable and slight modification can greatly alter performance of such compositions. Most of these compositions contain silicone fluid (usually dimethylpolysiloxane), often in combination with small amounts of silica filler. Additionally, these compositions may include various surfactants and dispersing agents in order to impart improved foam control or stability properties to the compositions.

Thus, for example, Rosen, in U.S. Pat. No. 4,076,648, teaches self-dispersible antifoam compositions consisting essentially of a lipophilic nonionic surface active agent homogeneously dispersed in a non-emulsified diorganopolysiloxane antifoam agent. This combination is said to promote dispersibility in water without the need for emulsification.

Kulkarni et al., in U.S. Pat. No. 4,395,352, improved upon the compositions disclosed by Rosen, cited supra, by limiting the viscosity of the dimethylpolysiloxane oil therein to the range of 5,000 to 30,000 cS at 25° C. Such a limitation, it is taught, unexpectedly resulted in improved efficiency in difficult-to-defoam aqueous systems, such as those which contain high concentrations of ionic surfactants and those which are very viscous.

Keil, in U.S. Pat. No. 3,784,479, discloses foam control compositions which consist essentially of a base oil selected from polyoxypropylene polymers, polyoxypropylene-polyoxyethylene copolymers or siloxane-glycol copolymers, a foam control agent comprising a liquid dimethylpolysiloxane and silica filler and a dispersing agent which consists of a copolymer of a siloxane resin and a polyoxyalkylene polymer. The contribution to the art in this case is stated to be improved compatibility with otherwise desirable diluents without resorting to emulsifying the foam control agent in water.

In a closely related patent, U.S. Pat. No. 3,984,347, Keil discloses foam control compositions which consist essentially of a base oil selected from polyoxypropylene polymers, polyoxypropylene-polyoxyethylene copolymers or siloxane-glycol copolymers, a foam control agent comprising a liquid dimethylpolysiloxane and silica filler and a siloxane copolymer dispersing agent. This time the dispersing agent consists of a copolymer of a dimethylpolysiloxane polymer and a polyoxyalkylene polymer. The same advantages as reported for U.S. Pat. No. 3,784,479, cited supra, were obtained.

A composition suitable for use as a defoamer in dyeing operations is taught by Colquhoun in U.S. Pat. No. 3,912,652. In this case, the composition consists of a copolymer of a dimethylpolysiloxane polymer and a polyoxyalkylene polymer combined with a lesser amount of a copolymer of a siloxane resin and a polyoxyalkylene polymer. Such compositions are stated to be particularly useful in jet dyeing operations since they are compatible with the dye carriers employed therein.

Japanese O.P.I. No. 139,107/81, published Oct. 30, 1981, teaches a self-emulsifying type defoaming agent which is said to have excellent foam-suppressing and breaking capability regardless of temperature and pH of a liquid to be treated and the storage period to which it is subjected. This agent is composed of a silicone copolymer having diorganosiloxane and organooxyalkylenesiloxane units in the copolymer chain.

Orlov et al., in *Chemistry and Practical Application of Organosilicon Compounds—Conference Proceedings*, pages 234–237, Leningrad, U.S.S.R. (1966), indicated that aqueous emulsions of antifrothing agents known as "Lentiisk" which are based on organosilicon compounds, retain their antifoam character at 20°–90° C. and pH 4–11 and can be stored for 1 year or more.

A process for control of foaming in non-aqueous systems is disclosed by Lomas in U.S. Pat. No. 4,460,493. The compositions employed consist essentially of (1) at least one foam control agent, selected from polydimethylsiloxane or poly(methyl-3,3,3-trifluoropropyl)siloxane, which may optionally include a minor portion of a siloxane resin, (2) a dispersing agent of the type described in the patents to Keil, cited supra, and (3) a non-ionic surfactant having an HLB number greater than 10. This invention is said to provide an effective and cost efficient foam control method for the non-aqueous systems described.

None of the above art references teach foam control in highly acidic aqueous foaming systems. This is particularly the case for highly acidic aqueous systems at elevated temperatures.

SUMMARY OF THE INVENTION

It has now been found that foam control agents based on certain dimethylpolysiloxane gum dispersions are particularly effective in controlling foaming in aqueous systems having a pH level below 4 and down to pH of about 1.0, especially at elevated temperatures which can be as high as about 250° C.

Thus, this invention relates to a process of controlling foam in an acidic aqueous foaming system which includes the addition of a foam control agent to said system, the improvement comprising using as the foam control agent a composition consisting essentially of:

(A) from 40 to 70 parts by weight of a dimethylpolysiloxane gum having a viscosity greater than about 150,000 Poise at 25° C.;

(B) from 10 to 20 parts by weight of a non-ionic surfactant having an HLB number greater than 10;

(C) from 5 to 10 parts by weight of a siloxane copolymer dispersing agent selected from the group consisting of 1. copolymers consisting essentially of $SiO_2$ units, $(CH_3)_3SiO_{\frac{1}{2}}$ units and $D(CH_3)_2SiO_{\frac{1}{2}}$ units in which D is a polyoxyethylene polymer having a molecular weight of at least 500, or a polyoxyethylene-polyoxypropylene copolymer having a molecular weight of at least 500 wherein the polyoxypropylene portion constitutes up to 50 mole percent of the copolymer, said D being attached to the silicon atom via a silicon-carbon bond, and the ratio of the $SiO_2$ units to the total $(CH_3)_3SiO_{\frac{1}{2}}$ and $D(CH_3)_2SiO_{\frac{1}{2}}$ units is in the range of 1:0.4 to 1:1.2, 2. copolymers which are reaction products derived from heating a mixture of a siloxane resin copolymer consisting essentially of $SiO_2$ units and (CH$_3$)$_3$SiO$_{\frac{1}{2}}$ units in which the ratio of SiO$_2$ units to (CH$_3$)$_3$SiO$_{\frac{1}{2}}$ units is in the range of 1:0.4 to 1:1.2, and a hydroxylated polyoxyethylene polymer having a molecular weight of at least 500, or a hydroxylated polyoxyethylene-polyoxypropylene copolymer having a molecular weight of at least 500 wherein the polyoxypropylene portion constitutes up to 50 mole percent of the copolymer.

3. polydimethylsiloxane-organic copolymer in which the polydimethylsiloxane portion has a molecular weight of at least 1400 and the organic portion consists essentially of a polyoxyethylene polymer having a molecular weight of at least 500, or a polyoxyethylene-polyoxypropylene copolymer having a molecular weight of at least 500 wherein said polyoxypropylene portion constitutes up to 50 mole percent of the organic portion of the copolymer, said organic portion being attached to silicon atoms via silicon-carbon bonds, and 4. polydimethylsiloxane-organic copolymers which are the reaction products produced by heating a mixture of a polydimethylsiloxane containing silicon bonded hydrogen atoms having a molecular weight of at least 1400 and a hydroxylated polyoxyethylene having a molecular weight of at least 500, or a hydroxylated polyoxyethylene-polyoxypropylene copolymer having a molecular weight of at least 500 wherein said polyoxypropylene constitutes up to 50 mole percent of the organic portion of the copolymer; and (D) from 0 to 45 parts by weight water.

DETAILED DESCRIPTION OF THE INVENTION

The process of the present invention utilizes a foam control agent which consists essentially of (A) a dimethylpolysiloxane gum, (B) a non-ionic surfactant, (C) a siloxane copolymer dispersing agent and, optionally, (D) water.

The first component (A) of the foam control agent used in the process of the present invention is a dimethylpolysiloxane gum having a viscosity greater than about 150,000 Poise at 25° C. This silicone gum comprises a plurality of dimethylsiloxane units, but may also contain up to about 5 mole percent of other siloxane units, such as monomethylsiloxane units, phenylmethylsiloxane units, methylhydrogensiloxane units, diphenylsiloxane units, trifluoropropylmethylsiloxane units or methylvinylsiloxane units. The gum may be capped with various end groups, such as silanol, trimethylsiloxy, dimethylvinylsiloxy, diphenylmethylsiloxy, phenyldimethylsiloxy or dimethylhydrogensiloxy. Preferred dimethylpolysiloxanes have the formulae Me$_3$SiO(Me$_2$SiO)$_n$SiMe$_3$ or (HO)Me$_2$SiO(Me$_2$SiO)$_n$SiMe$_2$(OH)

wherein Me hereinafter designates the methyl group and n is an integer consistent with the above recited viscosity constraint.

In the present invention, the dimethylpolysiloxane (Component A) is employed at about 40 to 70 parts by weight in the foam control agent. Preferably, this component is used at about 58 parts by weight.

The dimethylpolysiloxanes of this invention are well known in the art and are available commercially. There is thus no need to further describe their method of preparation.

The second component (B) of the foam control agent used in the process of the present invention is a non-ionic surface active agent (i.e., a surfactant) or surfactant mixture having an HLB number greater than about 10. The HLB methods of determining the characteristics of a surfactant are well known in the art. In brief, the HLB number is a measure of the balance of the size and strength of the water-loving (hydrophylic) and oil-loving (lipophylic) groups of the surfactant.

Specific examples of suitable non-ionic surfactants include polyoxyethylene octyl phenol containing 10 polyoxyethylene units, an alkyl ether of a polyoxyethylene polymer, an alkyl aryl ether of a polyoxyethylene polymer, a polyalkylene glycol ether of an alcohol and polyethylene glycol ethers of a secondary alcohol. It is preferred that component (B) is selected from ethoxylated $C_{11}$-$C_{15}$ alcohols having at least 5 moles of ethylene oxide.

In the most preferred embodiment, Component (B) consists of ethoxylated $C_{11}$-$C_{15}$ alcohols having, on average, 9 moles of ethylene oxide in the molecule. This surfactant has an HLB value of about 13.

In the present invention, the surfactant (Component B) is employed at about 10 to 20 parts by weight in the foam control agent. Preferably, this component is used at about 14 parts by weight.

The third component (C) of the foam control agent of this invention is a siloxane copolymer dispersing agent. Four types of siloxane dispersing agents have been found which will serve this purpose, and each is well known in the art.

One siloxane dispersing agent useful herein is a siloxane copolymer consisting essentially of SiO$_2$ units, (CH$_3$)$_3$SiO$_{\frac{1}{2}}$ units and D(CH$_3$)$_2$SiO$_{\frac{1}{2}}$ units in which D is a polyoxyethylene polymer having a molecular weight of at least 500, or a polyoxyethylene-polyoxypropylene copolymer having a molecular weight of at least 500 wherein the polyoxypropylene portion constitutes up to 50 mole percent of the copolymer, said D being attached to the silicon atom via a silicon-carbon bond, and the ratio of the SiO$_2$ units to the total (CH$_3$)$_3$SiO$_{\frac{1}{2}}$ and D(CH$_3$)$_2$SiO$_{\frac{1}{2}}$ units is in the range of 1:0.4 to 1:1.2.

A second siloxane dispersing agent useful herein is a siloxane copolymer reaction product derived from heating a mixture of a siloxane resin copolymer consisting essentially of SiO$_2$ units and (CH$_3$)$_3$SiO$_{\frac{1}{2}}$ units in which the ratio of SiO$_2$ units to (CH$_3$)$_3$SiO$_{\frac{1}{2}}$ units is in the range of 1:0.4 to 1:1.2. and a hydroxylated polyoxyethylene polymer having a molecular weight of at least 500, or a hydroxylated polyoxyethylene-polyoxypropylene copolymer having a molecular weight of at least 500 wherein the polyoxypropylene portion constitutes up to 50 mole percent of the copolymer. It is believed that these dispersing agents differ from those described immediately above only in that the polyoxyalkylene portion is attached to the silicon atom via a silicon-oxygen-carbon bond instead of a direct silicon-carbon bond. It is theorized that the reaction upon heating takes place between residual silanol known to exist in the siloxane and the hydroxyl groups in the polyoxyalkylene. Formation of the reaction product is facilitated by the use of a catalyst known to promote the silanol-carbinol condensation reaction, examples of such catalysts being bases such as potassium hydroxide and metal salts such as stannous octoate.

A third dispersing agent useful in this invention is a polydimethylsiloxane-organic copolymer in which the polydimethylsiloxane portion has a molecular weight of at least 1400 and the organic portion consists essentially of a polyoxyethylene polymer having a molecular weight of at least 500, or a polyoxyethylene-polyoxypropylene copolymer having a molecular weight of at least 500 wherein said polyoxypropylene portion constitutes up to 50 mole percent of organic portion of the copolymer, said organic portion being attached to silicon atoms via silicon-carbon bonds.

The final silicone dispersing agent useful herein is a siloxane-organic copolymer which is the reaction product produced by heating a mixture of a polydimethylsiloxane, containing silicon bonded hydrogen atoms, having a molecular weight of at least 1400 and a hydroxylated polyoxyethylene having a molecular weight of at least 500, or a hydroxylated polyoxyethylene-polyoxypropylene copolymer having a molecular weight of at least 500 wherein said polyoxypropylene constitutes up to 50 mole percent of the organic portion of the copolymer. As in the case of the second dispersing agent described above, this dispersing agent links the siloxane and organic portions of the copolymer through silicon-oxygen-carbon bonds. It is theorized that the reaction upon heating (for about two hours at reflux in, for example, xylene solution) takes place between the silicon bonded hydrogen atoms in the siloxane and the hydroxyl groups in the polyoxyalkylene. Formation of the reaction product is facilitated by the use of a catalyst known to promote the SiH-carbinol condensation reaction, examples of such catalysts being chloroplatinic acid and metal salts such as stannous octoate.

Further descriptions, and methods of preparation, of these silicone dispersing agents can be found in U.S. Pat. Nos. 3,784,479 and 3,984,347, cited supra. The siloxane resin copolymers, employed in the preparation of the dispersing agents, can be made according to methods detailed in U.S. Pat. No. 2,676,182.

For the purpose of this invention, the second of the above dispersing agents is preferred wherein a polyoxyethylene-polyoxypropylene copolymer, having a molecular weight of about 12,000 and containing approximately 75 weight percent polyoxyethylene and 25 weight percent polyoxypropylene groups, is reacted with said siloxane resin copolymer having $SiO_2$ units and $(CH_3)_3SiO_{\frac{1}{2}}$ units in a molar ratio of approximately 1:0.75.

In the present invention, the siloxane dispersing agent (Component C) is employed at about 5 to 10 parts by weight in the foam control agent. Preferably, this component is used at about 7 parts by weight.

The fourth component (D) of the foam control agent which may be used in the process of the present invention is water. In the present invention, the water (Component D) is employed at about 0 to 45 parts by weight in the foam control composition. Preferably, this component is used at about 20 parts by weight in order to provide good dispersion in the acidic aqueous foaming media.

In addition to components (A) through (D), the foam control agents of the present invention may contain adjuvants such as corrosion inhibitors or dyes.

The foam control agents of the present invention may be prepared by first mixing Components (B) and (C), preferably in a solvent such as xylene which is stripped off before further processing. This mixture is then blended with Component (A) using a sigma blade mixer, planetary mixer or other suitable mixer to obtain a uniform dispersion. The water, if desired, is then further blended in to form a uniform dispersion. As far as has been determined, the mixing procedures may be carried out at ordinary room temperature conditions.

In the process of the present invention, the above-described foam control agents may simply be added to an acidic aqueous foaming (or foam-producing) system at a concentration of about 0.01 to 0.3 percent by weight of said foaming system. The method of addition is not critical, and the foam control agent may be metered in or added by any of the techniques known in the art. The optimum amount of the foam control agent added to the foaming system may be determined by routine experimentation and will typically be the least amount of foam control agent which is effective in the application.

It has been found that the foam control agents of the present invention offer particular advantage when the foaming system comprises highly acid aqueous environments, such as those having a pH of less than 4. This holds particularly for highly acidic systems at elevated temperatures. Thus, for example, under the extremely harsh conditions encountered in the concentration stages of "wet process" phosphoric acid production (typically from about 30 to 70% phosphoric acid at approximately 100° to 180° C.), a foam control agent prepared according to the above-described preferred embodiment has been found more effective than other silicone-based antifoams. Under these circumstances, the foam control agent is preferably added at about 0.2 weight percent based on the foaming concentrated phosphoric acid system. The process of this invention, employing the above-described compositions, is effective in aqueous foaming systems at pH levels down to about 1.0 and at temperatures up to about 250° C.

It has also been found that high viscosity dimethylpolysiloxane fluids are somewhat effective in highly acidic aqueous foaming systems, but these materials give sporadic results with respect to defoaming time, presumably due to poor dispersibility.

EXAMPLES

The following examples are presented to further illustrate the process of this invention, but are not to be construed as limiting the invention, which is delineated in the appended claims. All parts and percentages in the examples are on a weight basis unless indicated to the contrary.

Example 1

A copolymeric dispersing agent (dispersant) was prepared by a method similar to that employed in Example 1 of U.S. Pat. No. 3,843,577. A siloxane resin copolymer, consisting essentially of $SiO_2$ units and $(CH_3)_3SiO_{\frac{1}{2}}$ units in a molar ratio of approximately 1:0.75, was added at a level of 6.6 parts to 13.4 parts of Ucon ® 75H 90000 (Union Carbide Corporation, Danbury, CT). Ucon ® 75H 90,000 is described as a diol-started polymer containing 75 weight percent oxyethylene and 25 weight percent oxypropylene groups, having a molecular weight of about 12,000 and a viscosity of about 90,000 Saybolt Universal Seconds at 100° F. The above mixture was refluxed for about six hours in a xylene solution (total solids kept at about 33%) along with 0.1 part of stannous octoate condensation catalyst. After addition of 0.056 part phosphoric acid, 40 parts of a non-ionic surfactant. Tergitol ® 15-S-9 (Union Carbide Corporation, Danbury, CT) was added and the bulk of the xylene stripped out under vacuum. Tergitol ® 15-S-9 is described as an ethoxylate of $C_{11}-C_{15}$ secondary alcohols having an average of 9 moles of ethylene oxide in the molecule and an average molecular weight of 596. The dispersant copolymer had a solids content of about 98%.

Example 2

To 21.6 parts of the composition of Example 1 there was added 58.4 parts of a dimethylpolysiloxane gum having hydroxy end groups and a Williams Plasticity of about 60 mils (this plasticity reading corresponds to a viscosity of about 200,000 Poise at 25° C.). This combination was mixed in a sigma-blade mixer till uniform, whereupon 20 parts of water was added. Further mixing was carried out until a homogeneous dispersion having a viscosity of about 400,000 cP at 25° C. resulted.

Example 3

One thousand grams of a 68% crude phosphoric acid, obtained as an intermediate product from a "wet process" operation, was heated to about 450° F. (232° C.) in a container. This generated a foam layer on the surface of the liquid acid. Approximately 2 grams of the composition of Example 2 was added to the surface of the foam layer and the amount of time that the foaming was significantly diminished was observed as the "effective time" of foam suppression. In this example, the effective time was 10 minutes.

(Comparative) Examples 4–6

The procedures of Example 3, above, were repeated using 2 grams of each of the following fluids:

Fluid C-1 = dimethylpolysiloxane having trimethylsiloxy end groups and a viscosity of about 1000 cS at 25° C.

Fluid C-2 = dimethylpolysiloxane having trimethylsiloxy end groups and a viscosity of about 60,000 cS at 25° C.

Fluid C-3 = 3,3,3-trifluoropropylmethylpolysiloxane having trimethylsiloxy end groups and a viscosity of about 10,000 cS at 25° C.

The results are summarized in the table below.

| (Comparative) No. | Fluid | Effective Time Example |
|---|---|---|
| 4 | Fluid C-1 | 5–10 seconds |
| 5 | Fluid C-2 | 5–6 minutes |
| 6 | Fluid C-3 | Not Effective. |

I claim:

1. In a process of controlling foam in an acidic aqueous foaming system which includes the addition of a foam control agent to said system, the improvement comprising using as the foam control agent a composition consisting essentially of:
   (A) from 40 to 70 parts by weight of a dimethylpolysiloxane gum having a viscosity greater than about 150,000 Poise at 25° C.;
   (B) from 10 to 20 parts by weight of a non-ionic surfactant having an HLB number greater than about 10;
   (C) from 5 to 10 parts by weight of a siloxane copolymer dispersing agent selected from the group consisting of
      1. copolymers consisting essentially of $SiO_2$ units, $(CH_3)_3SiO_{\frac{1}{2}}$ units and $D(CH_3)_2SiO_{\frac{1}{2}}$ units in which D is a polyoxyethylene polymer having a molecular weight of at least 500, or a polyoxyethylene-polyoxypropylene copolymer having a molecular weight of at least 500 wherein the polyoxypropylene portion constitutes up to 50 mole percent of the copolymer, said D being attached to the silicon atom via a silicon-carbon bond, and the ratio of the $SiO_2$ units to the total $(CH_3)_3SiO_{\frac{1}{2}}$ and $D(CH_3)_2SiO_{\frac{1}{2}}$ units is in the range of 1:0.4 to 1:1.2,
      2. copolymers which are reaction products derived from heating a mixture of a siloxane resin copolymer consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1:0.4 to 1:1.2, and a hydroxylated polyoxyethylene polymer having a molecular weight of at least 500, or a hydroxylated polyoxyethylene-polyoxypropylene copolymer having a molecular weight of at least 500 wherein the polyoxypropylene portion constitutes up to 50 mole percent of the copolymer;
      3. polydimethylsiloxane-organic copolymer in which the polydimethylsiloxane portion has a molecular weight of at least 1400 and the organic portion consists essentially of a polyoxyethylene polymer having a molecular weight of at least 500, or a polyoxyethylene-polyoxypropylene copolymer having a molecular weight of at least 500 wherein said polyoxypropylene portion constitutes up to 50 mole percent of the organic portion of the copolymer, said organic portion being attached to silicon atoms via silicon-carbon bonds, and
      4. polydimethylsiloxane-organic copolymers which are the reaction products produced by heating a mixture of a polydimethylsiloxane containing silicon bonded hydrogen atoms having a molecular weight of at least 1400 and a hydroxylated polyoxyethylene having a molecular weight of at least 500, or a hydroxylated polyoxyethylene-polyoxypropylene copolymer having a molecular weight of at least 500 wherein said polyoxypropylene constitutes up to 50 mole percent of the organic portion of the copolymer; and
   (D) from 0 to 45 parts by weight water, said foaming system having a pH of less than 4.

2. The process according to claim 1, wherein said siloxane copolymer dispersing agent is said reaction product derived from heating said siloxane resin copolymer and said hydroxylated polyoxyethylene polymer or said hydroxylated polyoxyethylene-polyoxypropylene copolymer.

3. The process according to claim 2, wherein said ratio of $SiO_2$ units to $(CH_3)_3SiO_{\frac{1}{2}}$ units is about 1:0.75.

4. The process according to claim 3, wherein said non-ionic surfactant is selected from ethoxylated $C_{11}$–$C_{15}$ alcohols having at least 5 moles of ethylene oxide.

5. The process according to claim 4, wherein said siloxane copolymer dispersing agent is derived by heating said resin copolymer with a hydroxylated polyoxyethylene-polyoxypropylene copolymer having a molecular weight of about 12,000 and containing 75 weight percent polyoxyethylene units.

6. The process according to claim 5, wherein said non-ionic surfactant is ethoxylated $C_{11}$–$C_{15}$ alcohols having 9 moles of ethylene oxide.

7. The process according to claim 6, wherein said dimethylpolysiloxane constitutes about 58 parts by weight, said non-ionic surfactant constitutes about 14 parts by weight, said siloxane copolymer dispersing agent constitutes about 7 parts by weight and said water constitutes about 20 parts by weight.

8. The process according to claim 1, wherein said foaming system comprises concentrated phosphoric acid.

* * * * *